United States Patent
Chang et al.

(10) Patent No.: US 7,161,991 B2
(45) Date of Patent: Jan. 9, 2007

(54) MULTI-DIMENSIONAL FRACTIONAL NUMBER OF BITS MODULATION SCHEME

(75) Inventors: Anchung Chang, San Gabriel, CA (US); Chu-Sieng Long, El Monte, CA (US); Samir B. Patel, Torrance, CA (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 10/142,461

(22) Filed: May 10, 2002

(65) Prior Publication Data

US 2003/0215023 A1    Nov. 20, 2003

(51) Int. Cl.
H04L 27/36 (2006.01)
H04L 27/38 (2006.01)

(52) U.S. Cl. .............. 375/298; 375/265; 375/340; 714/792

(58) Field of Classification Search ........... 375/261, 375/262, 265, 298, 340, 341; 714/786, 792, 714/794, 795
See application file for complete search history.

(56) References Cited

U.S. PATENT DOCUMENTS 4,941,154 A * 7/1990 Wei ...................... 375/265
5,493,586 A * 2/1996 Brownlie et al. ........ 375/265
6,088,387 A   7/2000 Gelblum et al.
6,330,277 B1  12/2001 Gelblum et al.
6,473,878 B1 * 10/2002 Wei ...................... 714/755

OTHER PUBLICATIONS

H. Sari, "Two-Dimensional Trellis-Coded Modulation With A Fractional Number Of Bits Per Symbol", 1996. vol. 1, pp. 349-353.
A. Chouly and H. Sari, "Six-Dimensional Trellis-Coding With QAM Signal Sets", IEEE Trans. Communications, vol. 40 No.1, pp. 24-33, Jan. 1992.
G. Ungerbock, "Channel Coding With Multilevel/Phase Signals", IEEE Trans. Information Theory, vol. IT-28, pp. 55-67, Jan. 1982.
Shu Lin / Daniel J. Costello, Jr., "Error Control Codings: Fundamentals and Applications", pp. 308-347.

* cited by examiner

*Primary Examiner*—Young T. Tse
(74) *Attorney, Agent, or Firm*—Ostranger Chong Flaherty & Broitman PC (57) ABSTRACT

A method of encoding information bits of a communication signal for a communication system (10) is provided. The method includes decomposing the communication signal having a corresponding $M_1$-ary modulation constellation into a $M_2$-ary constellation, and a $M_3$-ary constellation to generate one or more symbols $S_i$. The one or more symbols $S_i$ are mapped using a bit-to-symbol table to generate an encoded communication signal. Decoding methods are also provided for uncoded modulation and trellis coded modulation (TCM). A transmitter (20) comprising an encoder (12) for performing TCM that is capable of transmitting a fractional number of information bits per transmitted symbol is also provided.

19 Claims, 6 Drawing Sheets

MULTI-DIMENSIONAL FRACTIONAL NUMBER OF BITS MODULATION SCHEME

TECHNICAL FIELD

The present invention relates generally to coded and uncoded communication modulation schemes, and more particularly, to a method and system for transmitting and receiving a fractional number of bits per transmission symbol within a communication system.

BACKGROUND OF THE INVENTION

A number of criteria are reviewed when determining effectiveness of a communication system including: cost, channel bandwidth, required transmitter power, signal-to-noise ratios, probability of bit error, time delay, and other criteria known in the art. In order to satisfy the above criteria various modulation schemes and coding methods have been developed.

In order to increase bit rate modulation constellations of more than two points, such as quadrature amplitude modulation (QAM) and phase shift keying (PSK), have been used at the cost of smaller Euclidean distances, distances between adjacent points in a signal constellation. The smaller the distance between the points the more difficult to decipher between adjacent points.

Additionally, coding is used to minimize errors in a received communication signal. Errors develop through transmission due to communication system and environmental effects on the communication signal. For example, a binary "1" may be converted to a binary "0" or vice versa in a transmitted communication signal.

One such common coding scheme is channel coding, which introduces controlled redundancy in order to reduce channel error rates. As redundant bits are added for coding purposes overall symbol rate increases for a particular information data rate causing bandwidth to increase. Another coding scheme, the so-called Trellis-Coded Modulation (TCM), combines modulation and coding to achieve coding gain without increasing bandwidth. Bandwidth efficient trellis-coded modulation schemes are employed to ensure performance of various communication channels including satellite channels for higher throughput.

Traditionally, two-dimensional (2-D) TCM employs $2^{m+1}$ symbols to transmit an information signal containing m information bits per symbol. Each bit corresponding to a possible "0" or "1". Through coding m+1 coded bits are used to transmit m information bits. There are $2^{m+1}$ possible combinations of zeros and ones per symbol. Thus, the number of information bits m per transmitted symbol is an integer. For example, when transmitting four symbols per communication signal having two information bits per symbol, 12 coded bits are required, three coded bits per symbol. So when a communication system is required to send an information signal containing 9 information bits a full additional symbol must be used. The downfall to adding additional symbols is that the time of the completed transmission increases. If the time of the completed transmission is fixed the communication system power and bandwidth requirements will need to be increased to transmit one extra information bit. Therefore, the communication system is overbuilt and under utilized due to additional unused information bits. The additional requirements result in an inefficient and cost ineffective communication system.

Unfortunately with traditional TCM schemes, when m increases, coding gain increases more slowly and the error coefficient of the code begins to dominate performance. As the number of information bits is increased per symbol, constellations become difficult to create in 2-D. Additionally, cost of utilizing coded 2-D schemes is high, as compared to uncoded schemes, due to added redundant bits.

Multi-dimensional TCM provides higher coding gain and improved performance over 2-D TCM. Multi-dimensional TCM is used to reduce the number of redundant bits and constellation sizes and therefore reduce the manufacturing and operating costs. Several multi-dimensional schemes have been suggested, each having a large amount of constellation points in order to transmit a small number of information bits per symbol. The design purpose of the multi-dimensional schemes is to use additional dimensions over 2-D schemes to reduce the number of constellation points. However, it has been determined that the multi-dimensional schemes, although not designed to do so, may be used to transmit a fractional number of information bits per symbol.

Transmitting a fractional number of bits per symbol provides an appropriate amount of power and bandwidth for a desired amount of transmitted information bits and corresponding symbols and improves error performance. In other words, continuing from the above example the communication system may transmit 2.25 information bits per symbol on average instead of transmitting an additional symbol. The 2-D TCM fractional number of bits per symbol scheme has been suggested for 20-QAM, 24-QAM, 64-QAM, 96-QAM, and 112-QAM constellations. The 2-D TCM fractional number of bits per symbol scheme uses a partition tree to breakdown an initial constellation, at a top level, into multiple subsets, each subset having multiple representative constellations. A certain percentage of constellations in the lowest level subset have a first amount of uncoded bits and the remaining percentage have a second amount of uncoded bits. During modulation coded bits equally select between the lowest level subset constellations. Thus, in transmission a fractional average number of bits per symbol can be calculated depending upon the stated percentages.

Since the original design purpose of traditional multi-dimensional TCM methods was not to modulate a fractional number of bits per symbol, these methods are limited in effectiveness.

It would therefore be desirable to design a communication system transmitter and receiver that improves upon the above listed criteria including minimizing bit error rate, system complexity, and power consumption and is designed for the purpose of performing TCM for a fractional number of bits per symbol.

The goal in designing of a communication system is to minimize costs, channel bandwidth, required transmitter power, probability of bit error, time delay.

SUMMARY OF THE INVENTION

The present invention provides a method and apparatus for transmitting and receiving a fractional number of bits per transmission symbol within a communication system. A method of encoding information bits of a communication signal for a communication system is provided. The method includes decomposing the communication signal having a corresponding $M_1$-ary constellation into a $M_2$-ary constellation, and a $M_3$-ary constellation to generate one or more symbols $S_i$. The one or more symbols $S_i$ are mapped using a bit-to-symbol table to generate an encoded communication signal. Decoding methods are also provided for uncoded modulation and trellis coded modulation (TCM). A transmitter comprising an encoder for performing TCM that is capable of transmitting a fractional number of information bits per transmitted symbol is also provided.

One of several advantages of the present invention is the ability to encode and map multiple symbols simultaneously. In so doing providing an effective method of transmitting a fractional number of bits per symbol.

Another advantage of the present invention is system versatility and flexibility in that the present invention provides a generalized encoder method for M-ary QAM and PSK levels including lower QAM levels, for lower consumption and greater communication system efficiency.

Furthermore, the present invention provides a multi-dimensional TCM scheme for transmitting a fractional number of bits per symbol that has a low bit error rate and lower energy-per-bit noise density ratio as comparable to similar level M-ary traditional TCM methods.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

In each of the following figures, the same reference numerals are used to refer to the same components. While the present invention is described with respect to a method and apparatus for transmitting and receiving a fractional number of bits per transmission symbol within a communication system, the present invention may be adapted to be used in various systems including: satellite systems, ground based systems, telecommunication systems, mobile systems, aeronautical systems, and various other communication systems.

In the following description, various operating parameters and components are described for one constructed embodiment. These specific parameters and components are included as examples and are not meant to be limiting.

Also, in the following description the terms "communication signal" may refer to any signal transmitted or received in a communication system. A communication signal may be an encoded communication signal, a modulated signal, a serial interchange signal, an input or an output signal, or any other communication signal known in the art.

Figure 1:
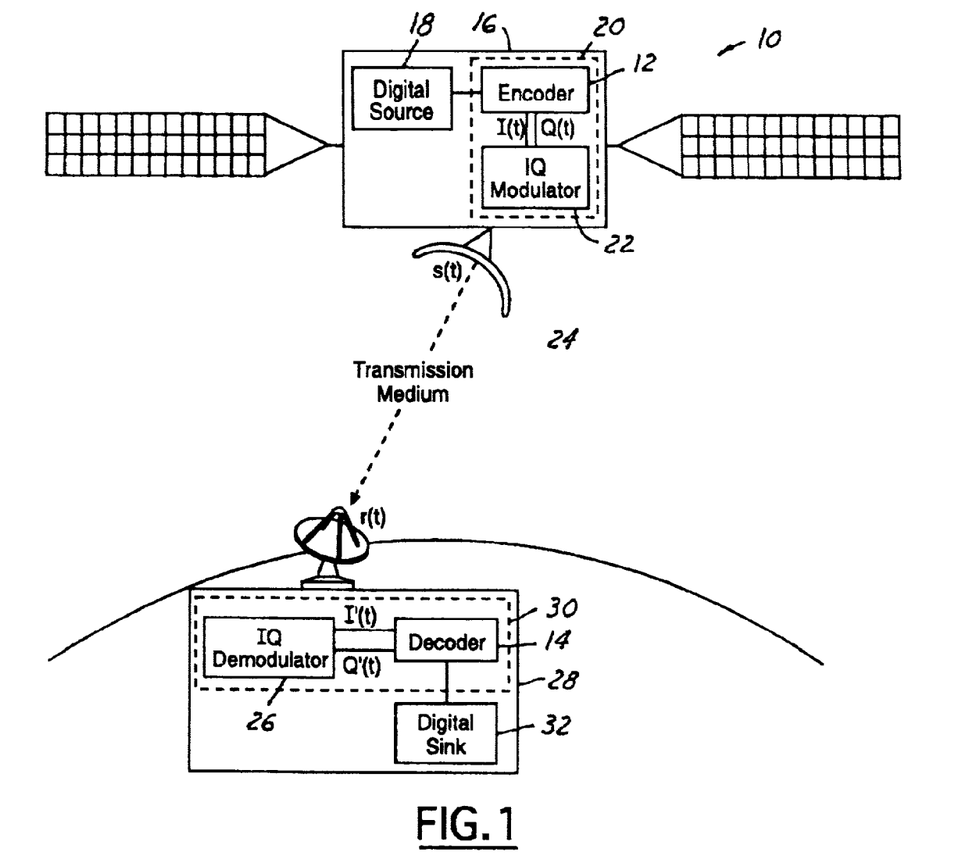
FIG. 1 is a block diagrammatic view of a satellite communication system having a transmitter encoder and a receiver decoder in accordance with an embodiment of the present invention.

Referring now to FIG. 1, a block diagrammatic view of a satellite communication system 10 having a transmitter encoder 12 and a receiver decoder 14 in accordance with an embodiment of the present invention, is shown. A satellite 16 includes a digital source 18 electrically coupled to the transmitter encoder 12 of a transmitter 20. The encoder 12 converts a digital source communication signal into Inphase-Quadrature (I-Q) signals I(t) and Q(t). The transmitter encoder 12 is also electrically coupled to an I-Q modulator 22, which convert the I-Q signals I(t) and Q(t) into a modulated signal s(t). The modulated signal s(t) is transmitted over a transmission medium 24 to an I-Q demodulator 26 of ground station 28. The transmission medium 24 converts the modulated signal s(t) into transmission medium signal or received signal r(t). r(t) is equal to modulated signal s(t) plus a noise signal n(t). The I-Q demodulator 26 converts the received signal r(t) into a modified I-Q signals I'(t) and Q'(t). The I-Q demodulator 26 is electrically coupled to the decoder 14 of a receiver 30. The decoder converts the modified I-Q signals I'(t) and Q'(t) into a decoded signal, which is received by a digital sink 32.

Figure 2:
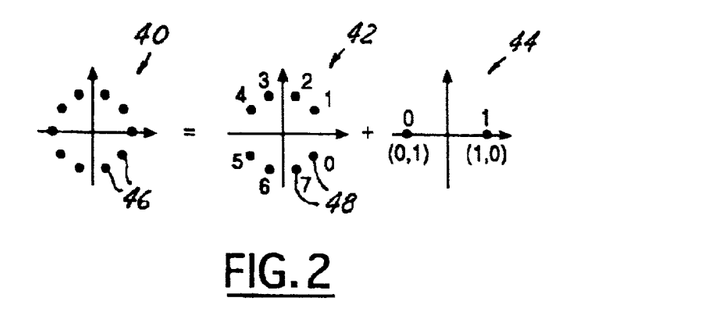
FIG. 2 is a 10-PSK constellation conversion to a 8-QAM constellation and a B-PSK constellation in accordance with an embodiment of the present invention.

Referring now to FIG. 2, a decomposition from a 10 phase shift keying (PSK) constellation 40 to an 8 quadrature amplitude modulation (QAM) constellation 42 and a binary (B)-PSK constellation 44 in accordance with an embodiment of the present invention, is shown. The 10-PSK constellation 40 has 10 points 46 corresponding to various phases of a communication signal. Points having coordinates (−1,0) and (1,0) are removed from the 10-PSK constellation to form the B-PSK constellation. Although, not illustrated each point 48 in the 8-QAM constellation may also have varying amplitude. The 10-PSK constellation 40 is intended for illustration purposes only, any $M_1$-ary constellation may be decomposed into an $M_2$-ary constellation and a $M_3$-ary constellation.

Figure 3:
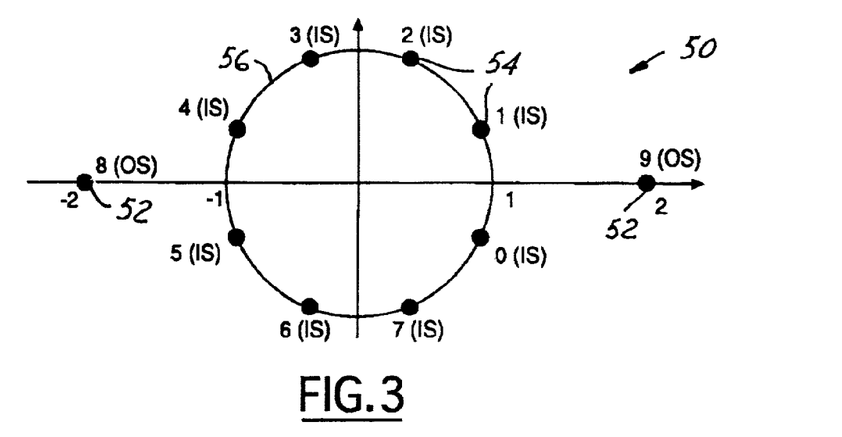
FIG. 3 is a 10-QAM constellation in accordance with an embodiment of the present invention.

Referring now to FIG. 3, a 10-QAM constellation 50 in accordance with an embodiment of the present invention, is shown. The 10-QAM constellation 50 is similar to the 8-QAM constellation and the B-PSK constellation shown in FIG. 2 except for amplitude differences in points 52, each having an amplitude of two instead of one. Points 54 located on a unit circle 56 are referred to as inner points correspond ing to at least one inner symbol. Points 52, having coordinates (−2,0) and (2,0) are referred to as outer points and correspond to at least one outer symbol. The 10-QAM constellation has $2^m$ inner symbols and $2^x$ outer symbols, where m is equal to three and x is equal to one. The 10-QAM constellation is also for illustration purposes only. Any $M_1$-ary constellation may be decomposed into an $M_2$-ary constellation and an $M_3$-ary constellation, where $M_1$ is equal to the total number of points 52 and 54, $M_2$ is equal to $2^m$, and $M_3$ is equal to $2^x$.

Figure 4:
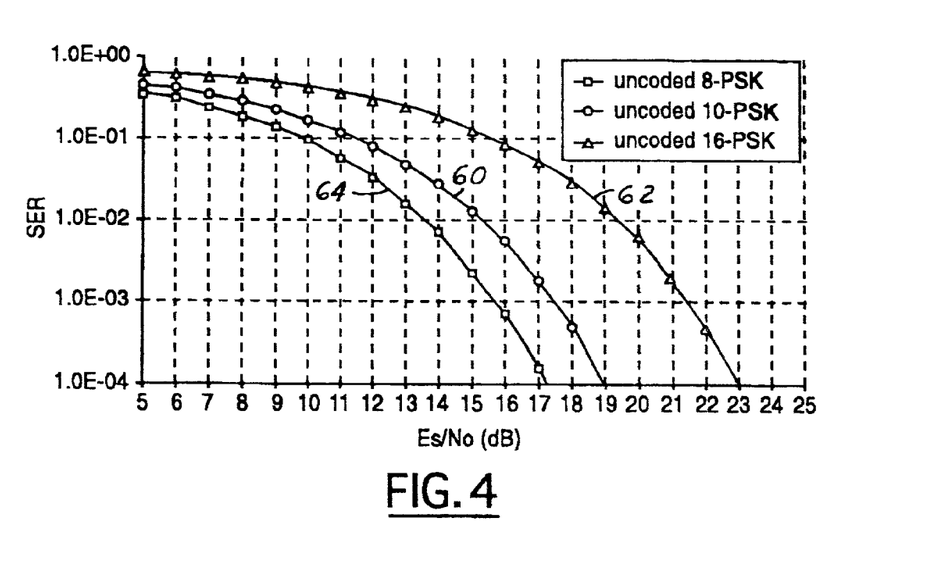
FIG. 4 is an uncoded simulation result comparison plot including an uncoded 10-PSK simulation result in accordance with an embodiment of the present invention.

Referring now to FIG. 4, an uncoded simulation result comparison plot including an uncoded 10-PSK simulation result in accordance with an embodiment of the present invention, is shown. Corresponding symbol error rate (SER) versus energy-per-bit/noise-density ratio (Es/No) curves for a traditional uncoded 8-PSK modulation scheme, a tradi- In step 72, the encoder generates $2^{(m-x)}$ symbol constellations, having $2^{(m-x)}$ symbols, such that there is $m+(\frac{1}{2})^{(m-x)}$ information bits per symbol.

In step 72a, encoder 12 decomposes the communication signal having a corresponding $M_1$-ary constellation into an $M_2$-ary constellation and a $M_3$-ary constellation to generate a symbol series containing one or more symbols $S_i$ in a specified order, where i=1, 2, 3, . . . . The encoder 12 uses $2^m+2^x$ary symbol constellations when decomposing the communication signal. So for the 10-PSK constellation 40 there are four symbols, each of which having either one or three information bits for B-PSK and 8-QAM constellations, respectively.

In step 72b, the one or more symbols $S_i$ are mapped, using a bit-to-symbol mapping rule in table 1, to generate an encoded communication signal.

TABLE 1

Bits-to-Symbol Mapping Rule for Uncoded 10-PSK

| Constellation | Position bits | | | Communication Signal having $S_i$ Symbols | | | |
|---|---|---|---|---|---|---|---|
| bit $I_{13}$ | $I_{11}$ | $I_{12}$ | | $S_1$ | $S_2$ | $S_3$ | $S_4$ |
| 0 | 0 or 1 | 0 or 1 | ⇒ Constellation Type Information Bits | 8QAM $I_1, I_2, I_3$ | 8QAM $I_4, I_5, I_6$ | 8QAM $I_7, I_8, I_9$ | 8QAM $I_{10}, I_{11}, I_{12}$ |
| 1 | 0 | 0 | ⇒ Constellation Type Information Bits | BPSK $I_1$ | 8QAM $I_2, I_3, I_4$ | 8QAM $I_5, I_6, I_7$ | 8QAM $I_8, I_9, I_{10}$ |
| 1 | 0 | 1 | ⇒ Constellation Type Information Bits | 8QAM $I_1, I_2, I_3$ | BPSK $I_4$ | 8QAM $I_5, I_6, I_7$ | 8QAM $I_8, I_9, I_{10}$ |
| 1 | 1 | 0 | ⇒ Constellation Type Information Bits | 8QAM $I_1, I_2, I_3$ | 8QAM $I_4, I_5, I_6$ | BPSK $I_7$ | 8QAM $I_8, I_9, I_{10}$ |
| 1 | 1 | 1 | ⇒ Constellation Type Information Bits | 8QAM $I_1, I_2, I_3$ | 8QAM $I_4, I_5, I_6$ | 8QAM $I_7, I_8, I_9$ | BPSK $I_{10}$ | tional uncoded 16-PSK modulation scheme, and the uncoded 10-PSK modulation scheme of the present invention, are shown. Curve 64 corresponds with the traditional uncoded 8-PSK modulation scheme. Curve 62 corresponds with the traditional uncoded 16-PSK modulation scheme. Curve 60 corresponds with the uncoded 10-QAM modulation scheme of the present invention.

When transmitting an additional information bit over the 8-PSK modulation scheme, traditionally, a 16-PSK modulation scheme was required. Note that there is a 5.8 db penalty between curve 60 and 62 at SER=10^−4. Using the uncoded 10-QAM modulation scheme of the present invention a 1.5 db increase occurs over the traditional 8-PSK modulation scheme, since 3.25 information bits per symbol are transmitted rather than 4 information bits per symbols as with the uncoded 16-PSK modulation scheme. The uncoded 10-PSK modulation scheme is further explained and generalized in the method shown in FIG. 5.

Figure 5:
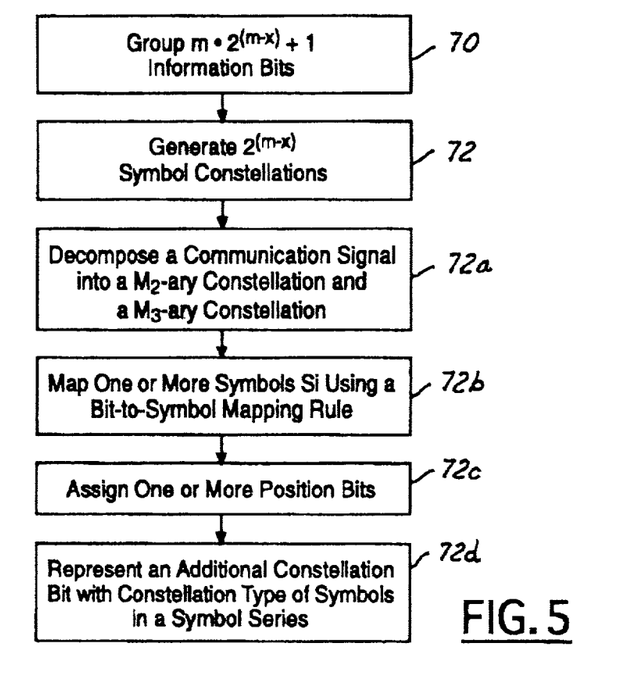
FIG. 5 is a logic flow diagram illustrating a method of encoding information bits of a communication signal for the communication system using uncoded modulation in accordance with an embodiment of the present invention.

Referring now to FIGS. 1 and 5, in FIG. 5 a logic flow diagram illustrating a method of encoding information bits of a communication signal for the satellite communication system 10 using uncoded modulation in accordance with an embodiment of the present invention, is shown.

In step 70, encoder 12 groups $m \cdot 2^{(m-x)}+1$ information bits, where x=1, 2, 3, . . . , m−1. The encoder receives a series of information bits and converts the series of information bits into $m \cdot 2^{(m-x)}+1$ parallel information bit groups.

In step 72c, if constellation bit is "1" then one symbol in $2^{(m-x)}$ symbols is assigned to have one or more position bits. For the 10-PSK example, $I_{13}$ is constellation bit and ($I_{11}, I_{12}$) are position bits corresponding with a B-PSK symbol position in a symbol series (4 symbols).

In step 72d, one constellation bit is represented by $2^{(m-x)}$ symbols. All symbols in a symbol series ($2^{(m-x)}$ symbols) are $M_2$-ary symbols (inner symbols) if the constellation bit is a "0". One symbol in a symbol series ($2^{(m-x)}$ symbols) is an $M_3$-ary symbol (outer symbol) if the constellation bit is a "1". So for example, using the 10-PSK scheme of the present invention, $I_{13}$ is a constellation bit determinative of whether a symbol series is corresponding with the 8-QAM constellation 42 or the B-PSK constellation 44. In the first row of Table 1, since $I_{13}$ is zero all symbols correspond with an 8-QAM constellation. In rows 2–5 of Table 1, since $I_{13}$ is one a B-PSK constellation corresponding symbol exists in each row.

The above-described steps are meant to be an illustrative example, the steps may be performed synchronously or in a different order depending upon the application.

Figure 6:
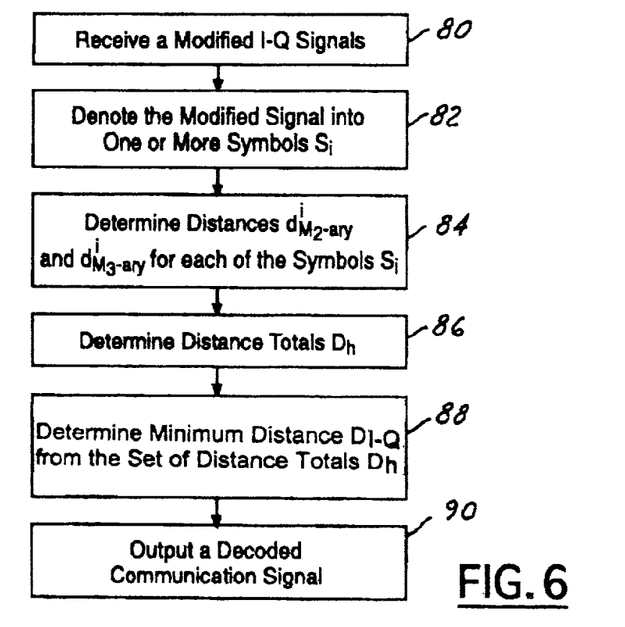
FIG. 6 is a logic flow diagram illustrating a method of decoding a received uncoded modulated communication signal in accordance with an embodiment of the present invention.

Referring now to FIGS. 1 and 6, a logic flow diagram illustrating a method of decoding a received uncoded modulated communication signal in accordance with an embodiment of the present invention, is shown.

In step 80, the decoder 14 receives the modified I-Q signals I'(t) and Q'(t).

In step 82, the decoder 14 denotes the modified I-Q signals I'(t) and Q'(t) into one or more symbols $S_i$ by grouping $2^{(m-x)}$ received symbols. For 10-PSK there are four symbols $S_1$, $S_2$, $S_3$, and $S_4$.

In step 84, one or more distances $d^i_{M2\text{-}ary}$ and one or more distances $d^i_{M3\text{-}ary}$ for each of the one or more symbols $S_i$ are determined, using methods known in the art, where i=1, 2, 3, ..., $2^{(m-x)}$.

In step 86, one or more distance totals $D_h$, for one or more possible symbol series ($2^{(m-x)}$ symbols), in response to the one or more distances $d^i_{M2\text{-}ary}$ and at most one $d^1_{M3\text{-}ary}$ are determined, where h=0, 1, 2, ... $2^{(m-x)}$. For the 10-PSK example the following is the known possible distance totals $D_h$:

$$D_0 = d^1_{8QAM} + d^2_{8QAM} + d^3_{8QAM} + d^4_{8QAM},$$

$$D_1 = d^1_{BPSK} + d^2_{8QAM} + d^3_{8QAM} + d^4_{8QAM},$$

$$D_2 = d^1_{8QAM} + d^2_{BPSK} + d^3_{8QAM} + d^4_{8QAM},$$

$$D_3 = d^1_{8QAM} + d^2_{8QAM} + d^3_{BPSK} + d^4_{8QAM},$$

$$D_4 = d^1_{8QAM} + d^2_{8QAM} + d^3_{8QAM} + d^4_{BPSK}.$$

In step 88, a distance total $D_{I\text{-}Q}$ for the modified I-Q signals I'(t) and Q'(t) is determined. $D_{I\text{-}Q}$ is the minimum distance from the set of distance totals $D_h$ above. The information bits corresponding to the $2^{m-x}$ symbols represented by $D_{I\text{-}Q}$ become the decoded communication signal.

In step 90, the decoder 14 outputs the decoded communication signal.

Figure 7:
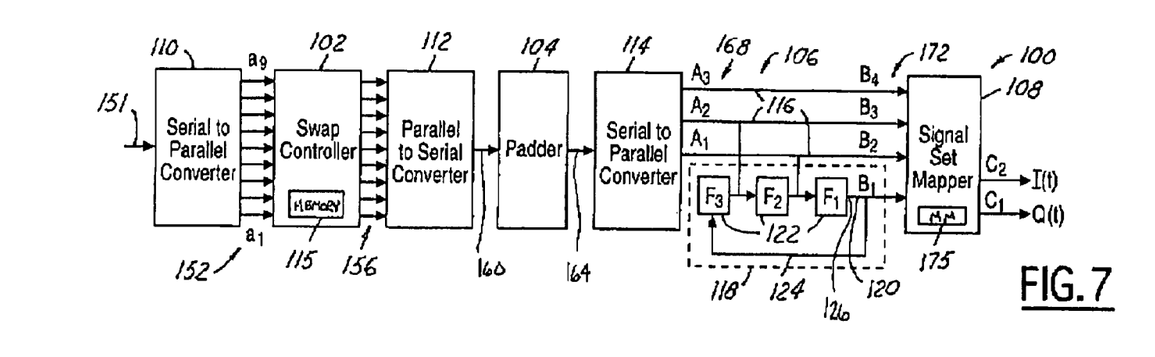
FIG. 7 is a block diagrammatic view of a multi-dimensional TCM transmitter encoder in accordance with an embodiment of the present invention.

Referring now to FIG. 7, a block diagrammatic view of a multi-dimensional TCM transmitter encoder 100 in accordance with an embodiment of the present invention, is shown. The encoder 100 may replace the encoder 12 from above in FIG. 1. The encoder 100 includes a swap controller 102, a padder 104, a convolutional encoder 106, and a signal set mapper 108. A communication signal is inputted into a first serial-to-parallel converter 110, which is electrically coupled to the swap controller 102, where the communication signal is received. The swap controller 102 appropriately positions symbols within the communication signal in conjunction with the padder 104, which inserts redundant bits into the communication signal. The swap controller 102 is electrically coupled to the padder 104 via a parallel-to-serial converter 112. The convolutional encoder 106 is electrically coupled to the padder 104 via a second serial-to-parallel converter 114. The convolutional encoder 106 is also electrically coupled to and operates in conjunction with the signal set mapper 108 to map the communication signal into modulated I-Q signals I(t) and Q(t). The padder 104 may be a solid-state stand-alone device or may be part of another device such as the swap controller 102.

The swap controller 102 is preferably microprocessor-based such as a computer having a central processing unit, memory 115 (RAM and/or ROM), and associated input and output buses. The swap controller 102 may be a portion of a central control unit or may be a stand-alone component. The swap controller 102 determines whether there is to be an outer symbol in the communication signal, and when there is an outer symbol, where the outer symbol is to be positioned relative to inner symbols within the communication signal. This is further explained in more detail below.

The convolutional encoder 106 includes multiple convolutional encoder channels 116. At least one convolutional encoder channel 116 has a redundant circuit 118. The redundant circuit 118 includes at least one redundant channel 120 having multiple delay components 122 and a feedback loop 124. The feedback loop 124 is electrically coupled to a redundant channel output 126 with a delay component $F_3$. Redundant bits received from the padder 104 are indicative of when to transmit an outer symbol. For the 10-QAM TCM example the convolutional encoder 106 has three input channels $A_1$–$A_3$, four output channels $B_1$–$B_4$, and three delay components $F_1$–$F_3$.

The signal set mapper 108 may also be a solid-state stand-alone device or may be part of another device such as the swap controller 102. The signal set mapper 108, for the 10-QAM example, has four input channels coinciding with the four output channels of the convolutional encoder 106, which are $B_1$–$B_4$. The signal set mapper also has two output channels $C_1$ and $C_2$. Note that each bit received from the second serial-to-parallel converter 114 within a communication signal is simultaneously coded by the convolutional encoder 106 and signal set mapper 108, unlike convolutional encoders of prior art.

Figure 8:
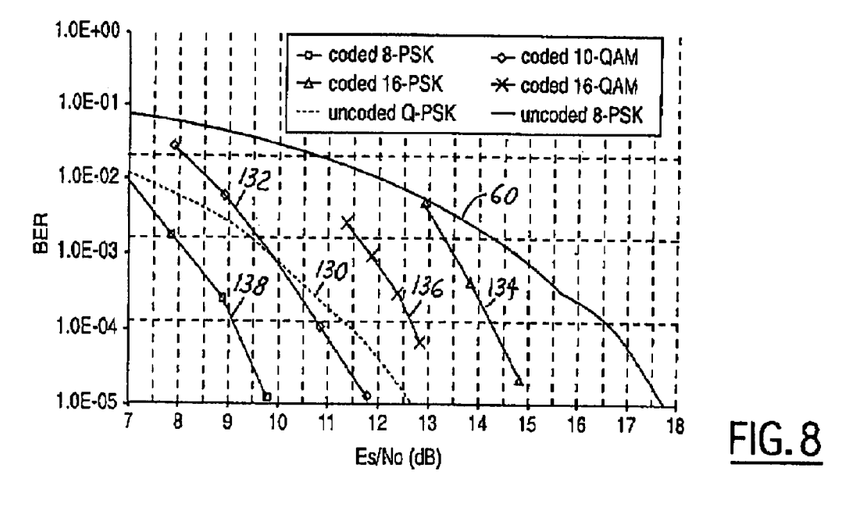
FIG. 8 is an uncoded and coded TCM comparison simulation result plot including a coded 10-QAM TCM simulation result in accordance with an embodiment of the present invention.

Referring now to FIG. 8, an uncoded and coded TCM comparison simulation result plot including a coded 10-QAM TCM simulation result in accordance with an embodiment of the present invention, is shown. Corresponding bit error rate (BER) versus energy-per-bit/noise-density ratio (Es/No) curves for a traditional uncoded Q-PSK modulation scheme, a traditional uncoded 8-PSK modulation scheme, a traditional coded 8-PSK modulation scheme, a traditional coded 16-PSK modulation scheme, a traditional coded 16-QAM modulation scheme, and a coded 10-QAM modulation scheme of the present invention. Curve 130 corresponds with the traditional uncoded Q-PSK modulation scheme. Curve 138 corresponds with the traditional coded 8-PSK modulation scheme. Curve 134 corresponds with the traditional coded 16-PSK modulation scheme. Curve 136 corresponds with the traditional coded 16-QAM modulation scheme. Curve 132 corresponds with a 10-QAM modulation scheme of the present invention. 2.25 information bits per symbol are transmitted using the 10-QAM scheme of the present invention transmitting, with a resulting Es/No=10.8 db at BER=$10^{-4}$.

Figure 9:
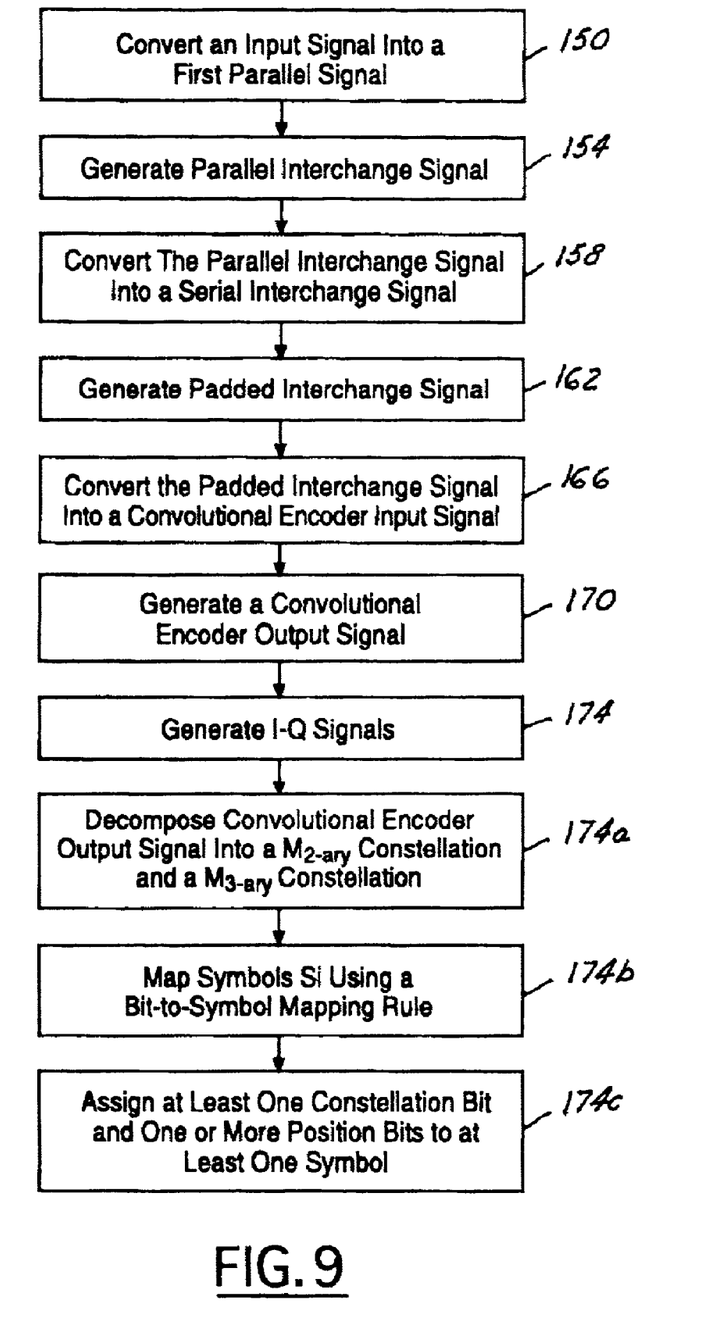
FIG. 9 is a logic flow diagram illustrating another method of encoding information bits of a communication signal for the satellite communication system using coded TCM in accordance with an embodiment of the present invention.

Referring now to FIGS. 7 and 9, a logic flow diagram illustrating another method of encoding information bits of a communication signal for the satellite communication system 10 using coded TCM in accordance with an embodiment of the present invention, is shown in FIG. 9. Modulated I-Q signals I(t) and Q(t) are generated to have m−1+(½)$^{(m-x)}$ information bits per symbol where x=1, 2, 3, ..., m−1.

In step 150, the first serial-to-parallel converter 110 converts an input signal 151 into a first parallel signal 152, by grouping (m−1)·$2^{(m-x)}$+1 information bits into parallel information bit groups. The first parallel signal 152 for the 10-QAM scheme has nine channels corresponding to nine information bits $a_1$, ..., $a_9$ that are contained within the input signal 151.

In step 154, the swap controller 102 swaps order of information bits in the first parallel signal 152 to generate a parallel interchange signal 156. For the 10-QAM example, bit 7 is a constellation bit and bits 8 and 9 are position bits, as shown in Table 2, which is stored in swap controller memory 115. When bit 7 is equal to 0 then no bits are swapped. When bit 7 is equal to a 1 then position bits 8 and 9 determine which bits are swapped.

TABLE 2

Bits-to-Symbol Mapping Rule for Trellis-coded 10-QAM

| Constellation | Position bits | | | Communication Signal having $S_i$ Symbols | | | |
|---|---|---|---|---|---|---|---|
| bit $a_7$ | $a_8$ | $a_9$ | | $S_1$ | $S_2$ | $S_3$ | $S_4$ |
| 0 | 0 or 1 | 0 or 1 | ⇒ coded symbol<br>Information Bits | IS<br>$a_1, a_2$ | IS<br>$a_3, a_4$ | IS<br>$a_5, a_6$ | IS<br>0, $a_8, a_9$ |
| 1 | 0 | 0 | ⇒ coded symbol<br>Information Bits | OS<br>1, 0, 0 | IS<br>$a_3, a_4$ | IS<br>$a_5, a_6$ | IS<br>$a_1, a_2$ |
| 1 | 0 | 1 | ⇒ coded symbol<br>Information Bits | IS<br>$a_1, a_2$ | OS<br>1, 0, 1 | IS<br>$a_5, a_6$ | IS<br>$a_3, a_4$ |
| 1 | 1 | 0 | ⇒ coded symbol<br>Information Bits | IS<br>$a_1, a_2$ | IS<br>$a_3, a_4$ | OS<br>1, 1, 0 | IS<br>$a_5, a_6$ |
| 0 | 1 | 1 | ⇒ coded symbol<br>Information Bits | IS<br>$a_1, a_2$ | IS<br>$a_3, a_4$ | IS<br>$a_5, a_6$ | IS<br>1, 1, 1 |

In step 158, a parallel-to-serial converter 112 converts the interchange signal 156 into a serial interchange signal 160. The converter 112 receives $m-1+(\frac{1}{2})^{(m-x)}$ information bits and one bit at a time is outputted from the converter 112.

In step 162, the padder 104 pads the serial interchange signal 160 with redundant bits to generate a padded interchange signal 164. The swap controller 102 may be electrically coupled to the padder 104 and generate a position signal. In response to the position signal the padder 104 pads the interchange signal 160 with zeros, as illustrated in Table 3. The single asterisk* cells in Table 3 are redundant bits. The double asterisk cells in Table 3 are constellation bit. The triple asterisk* cells in Table 3 are position bits.

| Output Symbol Series Options | Padder | $S_1$ | | | $S_2$ | | | $S_3$ | | | $S_4$ | | |
|---|---|---|---|---|---|---|---|---|---|---|---|---|---|
| 1 | input | $a_1$ | $a_2$ | | $a_3$ | $a_4$ | | $a_5$ | $a_6$ | | 0** | $a_8$ | $a_9$ |
| | output | 0* | $a_1$ | $a_2$ | 0* | $a_3$ | $a_4$ | 0* | $a_5$ | $a_6$ | 0** | $a_8$ | $a_9$ |
| 2 | input | 1** | 0*** | 0*** | $a_3$ | $a_4$ | | $a_5$ | $a_6$ | | $a_1$ | $a_2$ | |
| | output | 1** | 0*** | 0*** | 0* | $a_3$ | $a_4$ | 0* | $a_5$ | $a_6$ | 0* | $a_1$ | $a_2$ |
| 3 | input | $a_1$ | $a_2$ | | 1** | 0*** | 1*** | $a_5$ | $a_6$ | | $a_3$ | $a_4$ | |
| | output | 0* | $a_1$ | $a_2$ | 1** | 0*** | 1*** | 0* | $a_5$ | $a_6$ | 0* | $a_3$ | $a_4$ |
| 4 | input | $a_1$ | $a_2$ | | $a_3$ | $a_4$ | | 1** | 1*** | 0*** | $a_5$ | $a_6$ | |
| | output | 0* | $a_1$ | $a_2$ | 0* | $a_3$ | $a_4$ | 1** | 1*** | 0*** | 0* | $a_5$ | $a_6$ |
| 5 | input | $a_1$ | $a_2$ | | $a_3$ | $a_4$ | | $a_5$ | $a_6$ | | 1** | 1*** | 1*** |
| | output | 0* | $a_1$ | $a_2$ | 0* | $a_3$ | $a_4$ | 0* | $a_5$ | $a_6$ | 1** | 1*** | 1*** |

Table 3—Illustrating Redundant Bit Padding for 10-QAM

In step 166, the second serial-to-parallel converter 114 converts the padded interchange signal 164 into a convolutional encoder input signal 168. One information bit is inputted into the converter 114 at a time and m information bits are outputted from the converter 114.

In step 170, the convolutional encoder 106 codes the convolutional encoder input signal 168 to generate a convolutional encoder output signal 172 containing additional redundant bits from redundant channel 120. m information bits are inputted into the convolutional encoder 106 and m+1 information bits are outputted from the convolutional encoder 106. Table 4 illustrates a first 8 cases of 64 possible cases of the convolutional encoder 106, for the 10-QAM scheme.

TABLE 4

Sample Convolutional Encoder States for 10-QAM

Convolutional Encoder

| Input bits | | | Old states of Delay Components | | | New states of Delay Components | | | Output bits | | | |
|---|---|---|---|---|---|---|---|---|---|---|---|---|
| A3 | A2 | A1 | F3 | F2 | F1 | F3 | F2 | F1 | B4 | B3 | B2 | B1 |
| 0 | 0 | 0 | 0 | 0 | 0 | 0 | 0 | 0 | 0 | 0 | 0 | 0 |
| 0 | 0 | 1 | 0 | 0 | 0 | 0 | 0 | 1 | 0 | 0 | 1 | 0 |
| 0 | 1 | 0 | 0 | 0 | 0 | 0 | 1 | 0 | 0 | 1 | 0 | 0 |
| 0 | 1 | 1 | 0 | 0 | 0 | 0 | 1 | 1 | 0 | 1 | 1 | 0 |
| 1 | 0 | 0 | 0 | 0 | 0 | 0 | 0 | 1 | 0 | 0 | 1 | 0 |
| 1 | 0 | 1 | 0 | 0 | 0 | 0 | 1 | 1 | 0 | 1 | 1 | 0 |
| 1 | 1 | 0 | 0 | 0 | 0 | 0 | 1 | 0 | 1 | 1 | 0 | 0 |
| 1 | 1 | 1 | 0 | 0 | 0 | 0 | 1 | 1 | 1 | 1 | 1 | 0 |

In step 174, the signal set mapper 108 maps the convolutional encoder output signal 172 to generate the I-Q signals I(t) and Q(t), as shown in Table 5. The mapper 108 receives $(m-1) \cdot 2^{(m-x)}+1$ information bits and outputs $2^{(m-x)}$ symbols, such that there are $m-1+(\frac{1}{2})^{(m-x)}$ information bits per symbol. As in steps 70–70d described with respect to FIG. 5 above, the mapper 108 uses $2^m+2^x$ ary constellations when forming $2^m$-ary inner symbols and $2^x$-ary outer symbols. The two output channels $C_1$ and $C_2$ form the I-Q signals I(t) and Q(t), respectively. Table 5 illustrates mapping of all 64 possible convolutional encoder input states to signal set mapper output states. Each column in Table 5 represents three bits. So for example, the first case in Table 4 where A1–A3 all have a value of 0 corresponds with row 1, column 1 of Table 5. Also, the convolutional encoder input symbol and signal set mapper output symbol columns are doubled for delay component states that repeat. So in row 1, the convolutional encoder input first case and fifth case are shown having the same delay component states and respective signal set mapper output states.

TABLE 5

Sample Convolutional Encoder and Signal Set Mapper States for 10-QAM Coded TCM Scheme

| Convolutional Encoder Input symbol | | Old State of Delay Components | New State of Delay Components | Signal set Mapper Output Symbol | |
|---|---|---|---|---|---|
| 0 | 4 | 0 | 0 | 0 | 8 |
| 1 | 5 | 0 | 1 | 2 | 8 |
| 2 | 6 | 0 | 2 | 4 | 9 |
| 3 | 7 | 0 | 3 | 6 | 9 |
| 0 | 4 | 1 | 4 | 1 | 8 |
| 1 | 5 | 1 | 5 | 3 | 8 |
| 2 | 6 | 1 | 6 | 5 | 9 |
| 3 | 7 | 1 | 7 | 7 | 9 |
| 0 | 4 | 2 | 1 | 0 | 8 |
| 1 | 5 | 2 | 0 | 2 | 8 |
| 2 | 6 | 2 | 3 | 4 | 9 |
| 3 | 7 | 2 | 2 | 6 | 9 |
| 0 | 4 | 3 | 5 | 1 | 8 |
| 1 | 5 | 3 | 4 | 3 | 8 |
| 2 | 6 | 3 | 7 | 5 | 9 |
| 3 | 7 | 3 | 6 | 7 | 9 |
| 0 | 4 | 4 | 2 | 0 | 8 |
| 1 | 5 | 4 | 3 | 2 | 8 |
| 2 | 6 | 4 | 0 | 4 | 9 |
| 3 | 7 | 4 | 1 | 6 | 9 |
| 0 | 4 | 5 | 6 | 1 | 8 |
| 1 | 5 | 5 | 7 | 3 | 8 |
| 2 | 6 | 5 | 4 | 5 | 9 |
| 3 | 7 | 5 | 5 | 7 | 9 |
| 0 | 4 | 6 | 3 | 0 | 8 |
| 1 | 5 | 6 | 2 | 2 | 8 |
| 2 | 6 | 6 | 1 | 4 | 9 |
| 3 | 7 | 6 | 0 | 6 | 9 |
| 0 | 4 | 7 | 7 | 1 | 8 |
| 1 | 5 | 7 | 6 | 3 | 8 |
| 2 | 6 | 7 | 5 | 5 | 9 |
| 3 | 7 | 7 | 4 | 7 | 9 |

In step 174a, the signal set mapper 108 decomposes the convolutional encoder output signal 172 having a corresponding $M_1$-ary constellation into a $M_2$-ary constellation, and a $M_3$-ary constellation to generate one or more symbols $S_i$, where $M_2$ is $2^m$ inner points and $M_3$ is $2^x$ outer points. The $M_1$-ary constellation may be a PSK constellation or a QAM constellation.

In step 174b, the one or more symbols $S_i$ are mapped using a bit-to-symbol mapping rule illustrated in Table 2, above, which is stored in signal set mapper memory 175 to generate an encoded communication signal.

In step 174c, the signal set mapper 108 assigns at least one symbol of symbols $S_i$ to have one or more constellation bits, m−x position bits, and x−1 point bits. The constellation bits are indicative of whether the communication signal corresponds to the $M_2$-ary constellation or the $M_3$-ary constellation. The swap controller 102 assigns $(m-1) \cdot (2^{m-x})+1$ information bits to $2^{m-x}$ inner symbols or to $2^{m-x}-1$ inner symbols and one outer symbol in response to the constellation bit being a '0' or a '1', respectively. The position bits are indicative of one outer symbol positions. The symbols $S_i$ are repositioned in response to the m−x position bits. The point bits are indicative of an outer point configuration that has a minimum distance $d_{free}$, minimum distance between points. The outer symbol is selected from $2^x$-ary to maximize the minimum distance $d_{free}$ to minimize bit error. As for a more detailed understanding of $d_{free}$, "Error Control Coding: Fundamentals and Applications", by Shu Lin and Daniel J. Costelo, Jr. is incorporated herein by reference.

Figure 10:
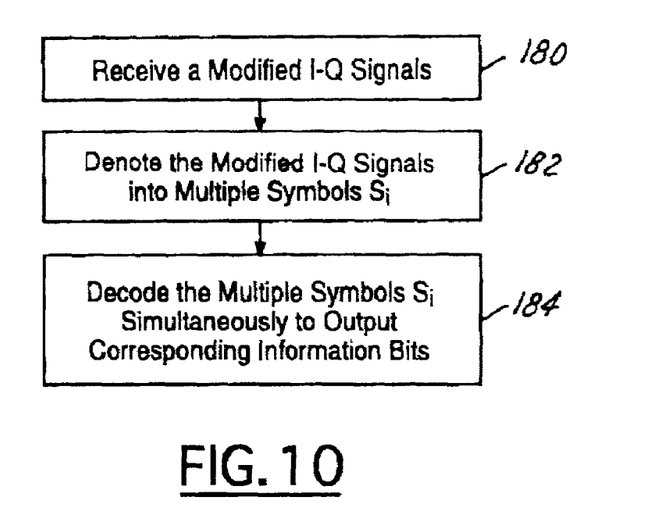
FIG. 10 is a logic flow diagram illustrating a method of decoding a received coded TCM communication signal in accordance with an embodiment of the present invention.

Referring now to FIG. 10, a method of decoding information bits for a communication system that uses the coded TCM scheme of the present invention, is shown.

In step 180, the decoder 14 receives the modified I-Q signals I'(t) and Q'(t), similar to step 80 above. A series of symbols are obtained.

In step 182, the decoder 14 denotes the modified I-Q signals I'(t) and Q'(t) into multiple symbols $S_i$, similar to step 82 above.

In step 184, the decoder 14 decodes the multiple symbols $S_i$ simultaneously and outputs information bits corresponding to the symbols. For further decoding algorithm detail see Viterbi decoding algorithm described in "Error Control Coding: Fundamentals and Applications", by Shu Lin and Daniel J. Costelo, Jr., which is incorporated herein by reference.

The present invention therefore provides a generalized uncoded and coded multi-dimensional modulation schemes that are designed for transmission of a fractional number of bits per symbol. The present invention, in doing so, has provided a flexible communication system with minimum operating power consumption, decreased bit error, and minimum signal-to-noise ratios.

The above-described apparatus, to one skilled in the art, is capable of being adapted for various purposes and is not limited to the following systems: satellite systems, ground based systems, telecommunication systems, mobile systems, aeronautical systems, and various other communication systems. The above-described invention may also be varied without deviating from the spirit and scope of the invention as contemplated by the following claims.

What is claimed is:

1. A trellis coded modulation transmitter encoder for a communication system comprising:

a first serial-to-parallel converter converting an input signal into a first parallel signal;

a swap controller electrically coupled to said first serial-to-parallel converter and swapping order of information bits in said first parallel signal to generate a parallel interchange signal;

a parallel-to-serial converter electrically coupled to said swap controller and converting said parallel interchange signal into a serial interchange signal;

a padder electrically coupled to said parallel-to-serial converter and padding said serial interchange signal with redundant bits to generate a padded interchange signal;

a second serial-to-parallel converter electrically coupled to said padder and converting said padded interchange signal into a convolutional encoder input signal;

a convolutional encoder electrically coupled to said second serial-to-parallel converter and coding said convolutional encoder input signal to generate a convolutional encoder output signal; and a signal set mapper electrically coupled to said convolutional encoder and mapping said convolutional encoder output signal to generate a modulated signal.

2. A transmitter encoder as in claim 1 wherein said convolutional encoder is guiding said redundant bits via a first channel into said signal set mapper.

3. A transmitter encoder as in claim 2 wherein said first channel is a redundant channel.

4. A transmitter encoder as in claim 2 wherein said signal set mapper maps said encoder output signal to generate said modulated signal in response to bits received from said first channel.

5. A transmitter encoder as in claim 1 wherein said convolutional encoder comprises a plurality of convolutional encoder channels and at least one convolutional encoder channel of said plurality of convolutional encoder channels comprises a redundant circuit.

6. A transmitter encoder as in claim 5 wherein said redundant circuit comprises:
   at least one redundant channel comprising;
   at least one delay component electrically coupled to at least one convolutional encoder channel of said plurality of convolutional encoder channels; and
   a feedback loop electrically coupling a redundant channel output to a delay component of said at least one delay component.

7. A transmitter encoder as in claim 1 wherein said redundant bits are indicative of when to transmit an outer symbol.

8. A transmitter encoder as in claim 1 wherein said swap controller generates a position signal and said padder pads said serial interchange signal in response to said position signal.

9. A transmitter encoder as in claim 1 wherein said second serial-to-parallel converter comprises a plurality of second serial-to-parallel converter output channels and each of said output channels in said plurality of second serial-to-parallel converter output channels is electrically coupled to at least one convolutional encoder input channel.

10. A method of encoding information bits of a communication signal for a communication system comprising:
   decomposing the communication signal having a corresponding $M_1$-ary constellation into a $M_2$-ary constellation and a $M_3$-ary constellation to generate a symbol series comprising one or more symbols $S_i$, said $M_2$-ary constellation and said $M_3$-ary constellation having fewer constellation points than said $M_1$-ary constellation; and
   mapping said one or more symbols $S_i$ using a bit-to-symbol table to generate an encoded communication signal.

11. A method as in claim 10 wherein said $M_2$-ary constellation and said $M_3$-ary constellation are quadrature amplitude modulation (QAM) constellations and binary phase shift keying (BPSK) constellation.

12. A method as in claim 10 further comprising:
   assigning at least one symbol in said one or more symbols $S_i$ to have one or more constellation bits and one or more position bits.

13. A method as in claim 10 wherein $M_2$ of said $M_2$-ary constellation is $2^m$ inner points and $M_3$ of said $M_3$-ary constellation is $2^x$ outer points, where m and x are integers.

14. A method as in claim 13 wherein decomposing the communication signal further comprises adjusting the communication signal to have at least one constellation bit that is indicative of said $M_2$-ary constellation or said $M_3$-ary constellation.

15. A method as in claim 14 wherein decomposing the communication signal further comprises assigning $(m-1)\cdot(2^{m-x})+1$ information bits to $2^{m-x}$ inner symbols in response to said at least one constellation bit where m and x are integers.

16. A method as in claim 15 wherein decomposing the communication signal further comprises assigning $(m-1)\cdot(2^{m-x})+1$ information bits to $2^{m-x}-1$ inner symbols and one outer symbol in response to said at least one constellation bit.

17. A method as in claim 16 wherein assigning $(m-1)\cdot(2^{m-x})+1$ information bits comprises:
   determining an outer symbol position in response to m–x position bits; and
   swapping said $S_i$ symbols in response to said m–x position bits.

18. A method as in claim 17 wherein assigning $(m-1)\cdot(2^{m-x})+1$ information bits comprises selecting said output symbol position from $2^x$ QAM to maximize a minimum distance $d_{free}$.

19. A method of decoding information bits for a communication system that uses uncoded modulation comprising:
   receiving modified I-Q signals;
   denoting said modified I-Q signals into one or more symbols $S_i$;
   determining one or more distances $d^i_{M2-ary}$ and one or more distances $d^i_{M3-ary}$ for each of said one or more symbols $S_i$ and calculating a distance total $D_{I-Q}$;
   determining one or more possible distance totals $D_h$ for said modified I-Q signals;
   comparing said distance total $D_{I-Q}$ for said modified I-Q signals with said one or more possible distances totals $D_h$; and
   outputting a decoded communication signal in response to said comparison.

* * * * *